(«12») United States Patent
Franck et al.

(10) Patent No.: US 10,677,936 B2
(45) Date of Patent: Jun. 9, 2020

(54) APPARATUS FOR MEASURING AN INTERNAL RADIOACTIVE CONTAMINATION IN AN INDIVIDUAL

(71) Applicant: INSTITUT DE RADIOPROTECTION ET DE SURETE NUCLEAIRE, Fontenay aux Roses (FR)

(72) Inventors: Alain Didier Franck, Igny (FR); Roger Marcel Didier Viltard, Carrieres-sous-Poissy (FR)

(73) Assignee: INSTITUT DE RADIOPROTECTION ET DE SURETE NUCLEAIRE, Fontenay aux Roses (FR)

( * ) Notice: Subject to any disclaimer, the term of this patent is extended or adjusted under 35 U.S.C. 154(b) by 0 days.

(21) Appl. No.: 16/093,927

(22) PCT Filed: Apr. 14, 2017

(86) PCT No.: PCT/EP2017/059061
§ 371 (c)(1),
(2) Date: Oct. 15, 2018

(87) PCT Pub. No.: WO2017/178648
PCT Pub. Date: Oct. 19, 2017

(65) Prior Publication Data
US 2019/0107633 A1 Apr. 11, 2019

(30) Foreign Application Priority Data

Apr. 15, 2016 (FR) ...................................... 16 53335

(51) Int. Cl.
*G01T 1/16* (2006.01)
*G01T 1/163* (2006.01)
*G01T 1/167* (2006.01)

(52) U.S. Cl.
CPC ................ *G01T 1/163* (2013.01); *G01T 1/16* (2013.01); *G01T 1/167* (2013.01)

(58) Field of Classification Search
CPC ................................... G01T 1/163; G01T 1/16
See application file for complete search history.

(56) References Cited

U.S. PATENT DOCUMENTS 4,760,260 A * 7/1988 Walsh ..................... G01T 1/163
250/363.02
5,330,142 A * 7/1994 Gnau, III ................ G01T 1/167
248/124.1

(Continued)

OTHER PUBLICATIONS

M. J. Youngman: 11 Calibration and evaluation of a transportable in vivo monitoring system for accident monitoring of internal contamination 11, Radiation Protection Dosimetry.,vol. 107, No. 4, Dec. 1, 2003 (Dec. 1, 2003), pp. 259-267, XP055317944, GB ISSN: 0144-8420, DOI: 10.1093/oxfordjournals.rpd.a006399 abstract p. 260 figures 1. 2.

(Continued)

*Primary Examiner* — Hugh Maupin
(74) *Attorney, Agent, or Firm* — B. Aaron Sculman, Esq.; Stites & Harbison, PLLC

(57) ABSTRACT

The device (10) comprises a first detector (16) for a measurement on a thyroid and a second detector (18) for a measurement on a thorax. It comprises a portable device (14) for supporting detectors, comprising: a transverse support crossmember (20), —at least one support leg (22) carrying said support cross-member (20), and —a support member (28), borne by the crossmember (20), including first (28A) and second (28B) portions movable relative to one another in a longitudinal direction (X), the first movable portion (28A) bearing the first detector (16), and the second movable portion (28B) bearing the second detector (18).

9 Claims, 1 Drawing Sheet

(56) References Cited

U.S. PATENT DOCUMENTS

| | | | |
|---|---|---|---|
| 5,531,228 A | 7/1996 | Doerfel | |
| 6,674,082 B1* | 1/2004 | Gunn | G01T 1/169 |
| | | | 250/363.01 |
| 8,487,263 B2 | 7/2013 | Kong et al. | |
| 9,971,040 B2 | 5/2018 | Dai et al. | |
| 2012/0076265 A1* | 3/2012 | Ohta | A61B 6/022 |
| | | | 378/62 |

OTHER PUBLICATIONS

Didier Franck et al: 11 Development of a fleet of mobile units for Accident Monitoring of Internal Contamination: application in the frame of Fukushima accident 11, Progress in Nuclear Science and Technology, vol. 4, Jan. 1, 2014 (Jan. 1, 2014), pp. 56-59, XP055318739, ISSN: 2185-4823, DOI: 10.15669/pnst.4.56 figures 1, 2, 4, 9.
International Search Report for PCT/EP2017/059061, dated Jun. 20, 2017.
Written Opinion of the International Search Authority for PCT/EP2017/059061, dated Jun. 20, 2017.
Preliminary Search Report for FR 1653335, dated Nov. 11, 2016.

* cited by examiner

APPARATUS FOR MEASURING AN INTERNAL RADIOACTIVE CONTAMINATION IN AN INDIVIDUAL

The present invention relates to an apparatus for measuring an internal radioactive contamination in an individual.

In case of nuclear accident, it is necessary to evaluate the resulting radiological risk in particular of internal radioactive contamination of people, especially of nuclear workers and the population.

To that end, already known in the state of the art are vehicles intended to check and evaluate the internal contamination of the population having been contaminated in case of crisis. These vehicles are equipped with devices for measuring the contamination.

Although such vehicles are particularly effective for performing their contamination inspection and evaluation functions, certain situations exist for which these vehicles are not appropriate.

In particular, it is necessary for the people to enter the vehicle to be examined therein. Yet in the case of people with reduced mobility, in particular on stretchers or in wheelchairs, these people are unable to access the measuring apparatuses of the vehicle.

Furthermore, in some cases, the vehicle may have difficulties accessing the places where the people should be examined.

The invention in particular aims to resolve these drawbacks by providing a measuring device making it possible to complete those of the aforementioned vehicles for the cases where these vehicles are inappropriate or for the cases where the people cannot be examined by the usual measuring devices.

To that end, the invention in particular relates to a device for measuring a radioactive contamination in an individual, comprising a first detector configured for a measurement on a thyroid of the individual, and a second detector configured for a measurement on a thorax of the individual, characterized in that it comprises a portable device for supporting the first and second detectors, comprising:
- a support crossmember extending in a transverse direction,
- at least one support leg, extending between a lower end intended to be placed on a floor, and an upper end bearing said support crossmember,
- a support member, borne by the crossmember, including first and second portions movable relative to one another in a longitudinal direction perpendicular to the transverse direction, the first movable portion bearing the first detector, and the second movable portion bearing the second detector.

Such a measuring device, further comprising a portable support device, can be transported easily outside any vehicle, to be adapted to a person with reduced mobility in particular, or to be brought into a zone inaccessible to a vehicle.

Owing to the mobility of the portions of the support member, the position of the detectors may be adapted to the morphology or the position of the person to be examined. It is therefore not necessary for these detectors to have large dimensions covering all morphologies.

The use of smaller detectors allows the use of a smaller support device, and more particularly a portable support device. "Portable" means that the support device can be transported easily by a smaller number of operators, ideally one or two operators, can be placed in any suitable environment, and can be moved manually.

A measuring device according to the invention can further comprise one or more of the following features, considered alone or in any technically possible combinations:
- The support member is movable by tilting around the crossmember, around the transverse direction.
- The crossmember being supported, in a vertical direction, at a height defined by the at least one support leg, each support leg is maneuverable such that said height is changeable.
- Each support leg is telescoping.
- The mass of the support device is less than 40 kg.
- Each support leg is assembled removably to the crossmember.
- The measuring device comprises a data acquisition device, including: a data acquisition chain connected to the detectors to collect data therefrom, and gamma spectrometry means, capable of acquiring a spectrum from collected data, and analyzing said spectrum.

The invention will be better understood upon reading the following description, provided solely as an example and done in reference to the appended figures, in which:

FIG. 1 shows a device 10 for measuring a radioactive contamination in an individual 12.

Figure 1:
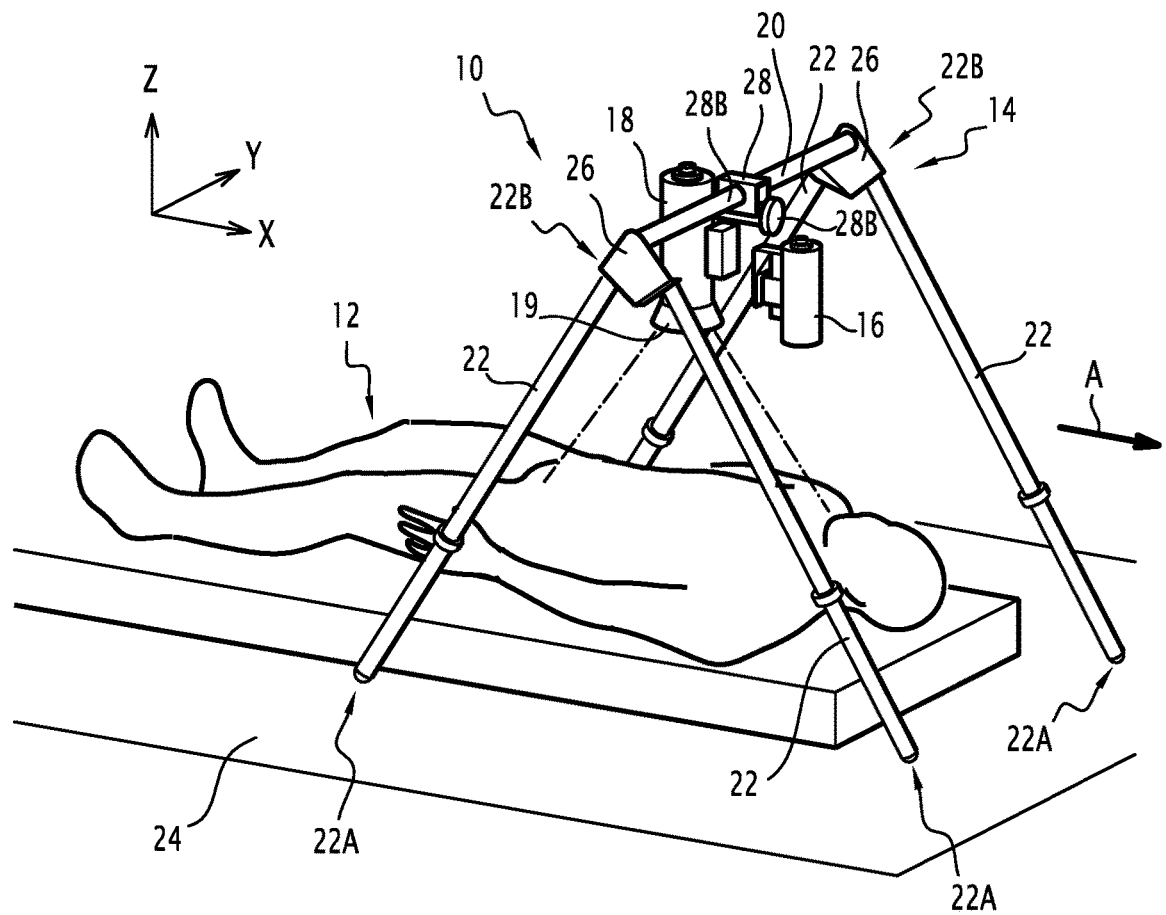
FIG. 1 is a perspective view of a measuring device according to one example embodiment of the invention, in the usage position on an elongated individual.
Figure 2:
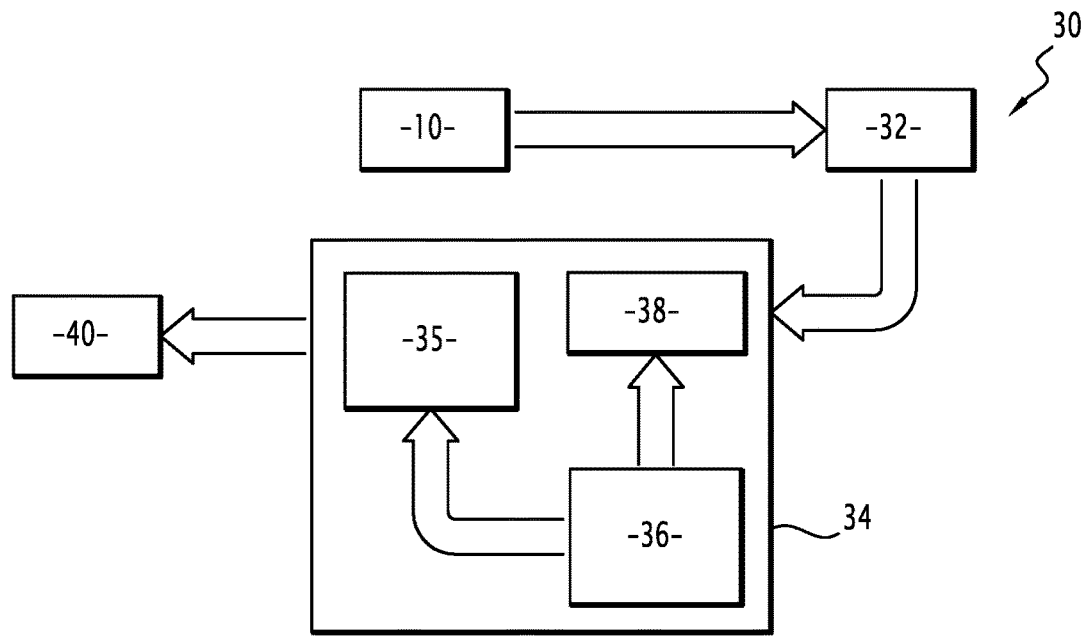
FIG. 2 is a schematic block diagram of the various components forming the measuring device of FIG. 1.

In this FIG. 1, the individual 12 is elongated, for example on a stretcher.

The measuring device 10 comprises a portable support device 14, intended to support first 16 and second 18 detectors for measuring radioactive contamination.

Each detector 16, 18 is intended to measure the X and gamma rays emitted by the targeted organs of the individual 12.

More particularly, the first detector 16 is configured for a measurement on the thyroid of the individual 12. This first detector 16 is therefore intended to be positioned at the neck of the individual 12.

The second detector 18 is configured for a measurement on the thorax of the individual 12. This second detector 18 therefore has dimensions larger than those of the first detector 16. This second detector 18 is intended to be positioned at the torso of the individual 12, to target organs such as the lungs, for instance, then by an appropriate calibration to make it possible to measure the contamination inside the entire body.

Each detector 16, 18 for example traditionally comprises a Sodium Iodide Crystal doped with Thallium NaI (Tl) and a photomultiplier. These detectors 16, 18 are capable of detecting X and gamma ($\gamma$) rays over energy ranges comprised between 20 and 2000 keV. Alternatively, the detector is of the Germanium (GeHP) semiconductor type, or an equivalent type.

The first detector 16 for example has a diameter of about 50 mm, and is preferably calibrated to measure energy ranges comprised between 100 and 1000 keV. The first detector 16 advantageously comprises a metal and lead collimator, intended to limit the background noise and reduce the impact of any transverse emissions that could distort the measurement in the thyroid, thereby making it possible to obtain reproducible measurements.

The second detector 18 for example has a diameter of about 76 mm, and is preferably calibrated to measure energy ranges comprised between 20 and 2000 keV. The second detector 18 advantageously comprises a metal and lead bell 19, intended to limit the background noise and reduce the impact of any transverse emissions that could distort the measurement.

The support device 14 comprises a support crossmember 20 extending in a transverse direction Y. This transverse direction Y is intended to extend across the individual 12. Thus, considering that the individual 12 extends along a general direction A, the support device 14 is arranged such that the transverse direction Y is substantially perpendicular to said general direction A.

The support crossmember 20 is supported by at least one support leg 22. More particularly, in the illustrated example, the support device 14 comprises four support legs 22, two of them being arranged at each end of the crossmember 20.

Each support leg 22 extends between a lower end 22A intended to be placed on a floor 24, and an upper end 22B bearing said support crossmember 20.

The terms "placed on the floor 24" mean that each support leg 22 is only placed on the floor 24, without any fastening or anchoring to said floor 24. Indeed, as previously indicated, the support device 14 is portable, and must therefore be able to be positioned in and removed from a usage location easily.

The crossmember 20 being supported, in a vertical direction Z, at a height defined by the support legs 22. Advantageously, each support leg 22 is maneuverable such that said height is changeable, to arrange said crossmember 20 at a desired height appropriate for the use of the measuring device 10.

For example, the upper end 22B of each leg 22 is connected to the crossmember 20 by a connecting element 26.

Furthermore, each support leg 22 is telescoping, such that its length is variable, the height of the crossmember 20 being changeable based on said length of the support feet 22.

The support device 14 furthermore comprises a support member 28, borne by the crossmember 20, and including first 28A and second 28B portions movable relative to one another in a longitudinal direction X perpendicular to the transverse direction Y. To that end, said first 28A and second 28B portions are for example telescoping.

The first movable portion 28A bears the first detector 16, and the second movable portion 28B bears the second detector 18. Thus, the separation between the first detector 16 and the second detector 18 is variable, and may therefore be adapted to the morphology of the individual 12, in particular to its size, which may vary greatly, the population of individuals to be examined being able to comprise adults and children.

Preferably, the first detector 16 is connected to the first movable portion 28A by a deployable and advantageously tilting arm, making it possible to bring the first detector closer to the neck of the individual 12, for example up to 3 cm from said neck.

Advantageously, the support member 28 is movable by tilting around the crossmember 20, around an axis parallel to the transverse direction Y. Thus, the orientation of the first 16 and second 18 detectors may be adapted to the position of the individual 12, to align the longitudinal direction X with the general direction A in which the individual 12 extends. This tilt is for example done by changing the length of the telescoping feet 22.

It will be noted that the crossmember 20 is for example formed in two portions, on either side of the support member 28, each portion connecting the support member 28 to a respective one of the connecting elements 26. These two portions may have substantially identical lengths, or alternatively different lengths.

In the example of FIG. 1, the individual 12 is elongated, such that the general direction A is perpendicular to the vertical direction Z. The longitudinal direction X is therefore aligned with said general direction A, substantially perpendicular to the vertical direction Z. The first 16 and second 18 detectors are then oriented downward in the vertical direction Z.

In the case where the individual 12 is seated, for example in a wheelchair, the general direction A of the individual 12 would be substantially parallel to the vertical direction Z, or slightly inclined relative to said vertical direction Z. In order to orient the first 16 and second 18 detectors toward the individual 12, the support member 28 must then be tilted so as to orient these first 16 and second 18 detectors substantially horizontally.

In the case where the individual 12 is inclined, for example on a stretcher inclined at 45°, it is then also possible to incline the support member 28 to orient the first 16 and second 18 detectors toward the individual 12.

Thus, by modifying the height of the crossmember 20 by maneuvering the support legs 22, modifying the incline of the support member 28, and modifying the spacing between the first 16 and second 18 detectors, it is possible to adapt the measuring device 10 to all configurations of individuals and types of measurements.

In the state of the art, the changes in positioning of the detectors are limited, which causes these detectors of the state of the art to have large dimensions to be able to cover all configurations of individuals.

In the invention, owing to the large adaptation capacity of the support device 14, the first 16 and second 18 detectors have smaller dimensions. The support device 14 may thus also have smaller dimensions while being able to bear the first 16 and second 18 detectors stably and effectively.

Thus, the support device 14 is portable. "Portable" means that the support device 14 may be transported by one or two operators.

To that end, the mass of the support device 14 is less than or equal to 40 kg. Preferably, the distribution of said mass is limited to two portions less than or equal to 25 kg when the support device 14 is intended to be transported by a single operator, or alternatively may be distributed into several modules, the total mass of which is less than or equal to 40 kg.

For example, advantageously, each support leg 22 has a diameter smaller than 10 cm. The crossmember 20 also for example has a diameter smaller than 10 cm. In the illustrated example, the support legs 22 and the crossmember 20 both have a circular cross-section, but other sections may be considered, in particular rectangular or square. The support legs 22 and the crossmember 20 are for example made from a rigid, lightweight material having a nil natural radioactivity so as not to distort the measurements.

The support legs 22 are for example formed in two telescoping portions allowing a length variation comprised between 650 mm (minimum) and 1150 mm (maximum).

The crossmember 20 is for example formed from two tubes, for example with a length equal to 320 mm, 370 mm or 445 mm.

Advantageously, the support device 14 can be disassembled, so as to make it even more mobile. The disassembled support device 14 can thus be transported in a suitcase adapted to that purpose, or distributed in two or more suitcases.

Thus, each support leg 22 is advantageously assembled removably to the crossmember 20, by means of the support member 28. This removable assembly can be done in all foreseeable manners.

Likewise, the support member 28 is advantageously removably assembled to the crosspiece 20.

Lastly, each detector 16, 18 is advantageously removably assembled to the support member 28.

The measuring device 10 further comprises a data acquisition device 30, including a data acquisition chain 32 connected to the detectors 16, 18 to collect data therefrom, and gamma spectrometry means 34, capable of acquiring a spectrum from collected data, and analyzing said spectrum.

The acquisition chain 32 is formed by a set of electronic components capable of connecting the detectors 16, 18 using spectrometry means 34, to collect the data from the detectors 16, 18 to send them to the spectrometry means 34.

Advantageously, the acquisition chain 32 is configured to deliver a high voltage, amplify the signals, and comprises an encoder and a multichannel analyzer.

For example, the acquisition chain 32 is formed by a UniSPEC® module by the company Canberra, connected to the spectrometry means 34 via a USB cable.

The spectrometry means 34 allow the simultaneous viewing and recording of the gamma spectrums, which are next analyzed by spectrometry software 35 known in itself, for example the Genie 20000 spectrometry software by CANBERRA and the GEMINI® software developed by the IRSN. The spectrometry means 34 are for example formed by a computer configured to that end. This computer is for example intended to be placed on board a vehicle, or to be of the portable type.

The spectrometry means 34 traditionally comprise a man/machine interface 36. Advantageously, said interface 36 is simplified to be used easily by an operator without requiring in-depth training on the use of spectrometry software. The aforementioned GEMINI® software proposes such a simplified interface.

It will be noted that the acquisition chain is controlled by the interface 36 associated with the software 35.

Lastly, the spectrometry means 34 traditionally comprise means 38 for reading the spectrum.

The spectrums are viewed, analyzed, and make it possible to provide anthroporadiometric data 40.

The use of the data acquisition device 30 is known in itself, and will therefore not be described in more detail.

It will be noted that the invention is not limited to the embodiment previously described, but could assume various complementary alternatives.

The invention claimed is:

1. A measuring device for measuring a radioactive contamination in an individual, comprising a first detector configured for a measurement on a thyroid of the individual, and a second detector configured for a measurement on a thorax of the individual, wherein it comprises a portable device for supporting the first and second detectors, comprising:
   a support crossmember extending in a transverse direction that is perpendicular to a vertical direction,
   at least one support leg, extending between a lower end intended to be placed on a floor, and an upper end bearing said support crossmember,
   a support member, borne by the support crossmember, including first and second movable portions movable relative to one another in a longitudinal direction perpendicular to the transverse direction and perpendicular to the vertical direction, the first movable portion bearing the first detector, and the second movable portion bearing the second detector.

2. The measuring device according to claim 1, wherein the support member is movable by tilting around the support crossmember, around the transverse direction.

3. The measuring device according to claim 1, wherein the support crossmember being supported, in a vertical direction, at a height defined by the at least one support leg, each support leg is maneuverable such that said height is changeable.

4. The measuring device according to claim 3, wherein each support leg is telescoping.

5. The measuring device according to claim 1, wherein the mass of the support device is less than 40 kg.

6. The measuring device according to claim 1, wherein each support leg is assembled removably to the support crossmember.

7. The measuring device according to claim 1, comprising a data acquisition device, including:
   a data acquisition chain connected to the detectors to collect data therefrom,
   gamma spectrometer, capable of acquiring a spectrum from collected data, and analyzing said spectrum.

8. A measuring device for measuring a radioactive contamination in an individual, comprising a first detector configured for a measurement on a thyroid of the individual, and a second detector configured for a measurement on a thorax of the individual, wherein it comprises a portable device for supporting the first and second detectors, comprising:
   a support crossmember extending in a transverse direction that is perpendicular to a vertical direction,
   at least one support leg, extending between a lower end intended to be placed on a floor, and an upper end bearing said support crossmember,
   a support member, borne by the support crossmember, including first and second movable portions movable relative to one another in a longitudinal direction perpendicular to the transverse direction and perpendicular to the vertical direction, the first movable portion bearing the first detector, and the second movable portion bearing the second detector,
wherein first movable portion and second movable portion both belong to the same support member.

9. A measuring device for measuring a radioactive contamination in an individual, comprising a first detector configured for a measurement on a thyroid of the individual, and a second detector configured for a measurement on a thorax of the individual, wherein it comprises a portable device for supporting the first and second detectors, comprising:
   a support crossmember extending in a transverse direction that is perpendicular to a vertical direction,
   at least one support leg, extending between a lower end intended to be placed on a floor, and an upper end bearing said support crossmember,
   a support member, borne by the support crossmember, including first and second movable portions movable relative to one another in a longitudinal direction perpendicular to the transverse direction and perpendicular to the vertical direction, the first movable portion bearing the first detector, and the second movable portion bearing the second detector,
   wherein the separation between first detector and second detector is variable, owing to relative translation between first and second movable portions along the longitudinal direction.

* * * * *